United States Patent [19]

Marui et al.

[11] Patent Number: 4,961,212
[45] Date of Patent: Oct. 2, 1990

[54] VOICE RECOGNITION SYSTEM USED IN TELEPHONE APPARATUS

[75] Inventors: Kuniyoshi Marui, Tokorozawa; Takaaki Ishii, Sagamihara; Shinya Takahashi, Hino, all of Japan

[73] Assignee: Kabushiki Kaisha Toshiba, Kanagawa, Japan

[21] Appl. No.: 432,312

[22] Filed: Nov. 3, 1989

Related U.S. Application Data

[63] Continuation of Ser. No. 198,821, May 25, 1988, abandoned.

[30] Foreign Application Priority Data

May 29, 1987 [JP] Japan .................................. 62-133906
Jul. 20, 1987 [JP] Japan .................................. 62-180833

[51] Int. Cl.$^5$ ..................... H04M 1/272; H04M 1/64; H04M 11/00
[52] U.S. Cl. ........................................ 379/67; 379/63; 379/88; 379/354; 379/388
[58] Field of Search ........................ 379/80, 74, 88, 89, 379/62, 52, 389, 390, 388, 63, 58, 354, 355, 356, 67

[56] References Cited

U.S. PATENT DOCUMENTS

| | | | |
|---|---|---|---|
| 3,993,877 | 11/1976 | Sendyk et al. | 379/355 |
| 4,109,104 | 8/1978 | Toyoshima | 364/513.5 |
| 4,158,750 | 6/1979 | Sakoe et al. | 381/43 |
| 4,348,550 | 9/1982 | Pirz et al. | 379/357 |
| 4,558,178 | 12/1985 | Yasuda et al. | 379/63 |
| 4,578,540 | 3/1986 | Borg et al. | 379/40 |
| 4,644,107 | 2/1987 | Clowes et al. | 379/354 |
| 4,731,811 | 3/1988 | Dubus | 379/58 |

FOREIGN PATENT DOCUMENTS 194387 1/1986 European Pat. Off. .
88304887 11/1989 European Pat. Off. .

Primary Examiner—Thomas W. Brown
Attorney, Agent, or Firm—Finnegan, Henderson, Farabow, Garrett and Dunner

[57] ABSTRACT

A voice recognizing telephone apparatus in which the telephone apparatus recognizes a speech input and stores the telephone numbers that correspond to the speech input. When the user makes an outgoing call to another telephone apparatus by speaking the telephone number corresponding to the other telephone apparatus, the telephone number is read out from stored telephone numbers and then is dialed. The stored telephone numbers can be erased entirely or partially. During operations of storing a telephone number into the memory, the voice recognizing telephone apparatus cannot make an outgoing call or receive an incoming call.

2 Claims, 15 Drawing Sheets

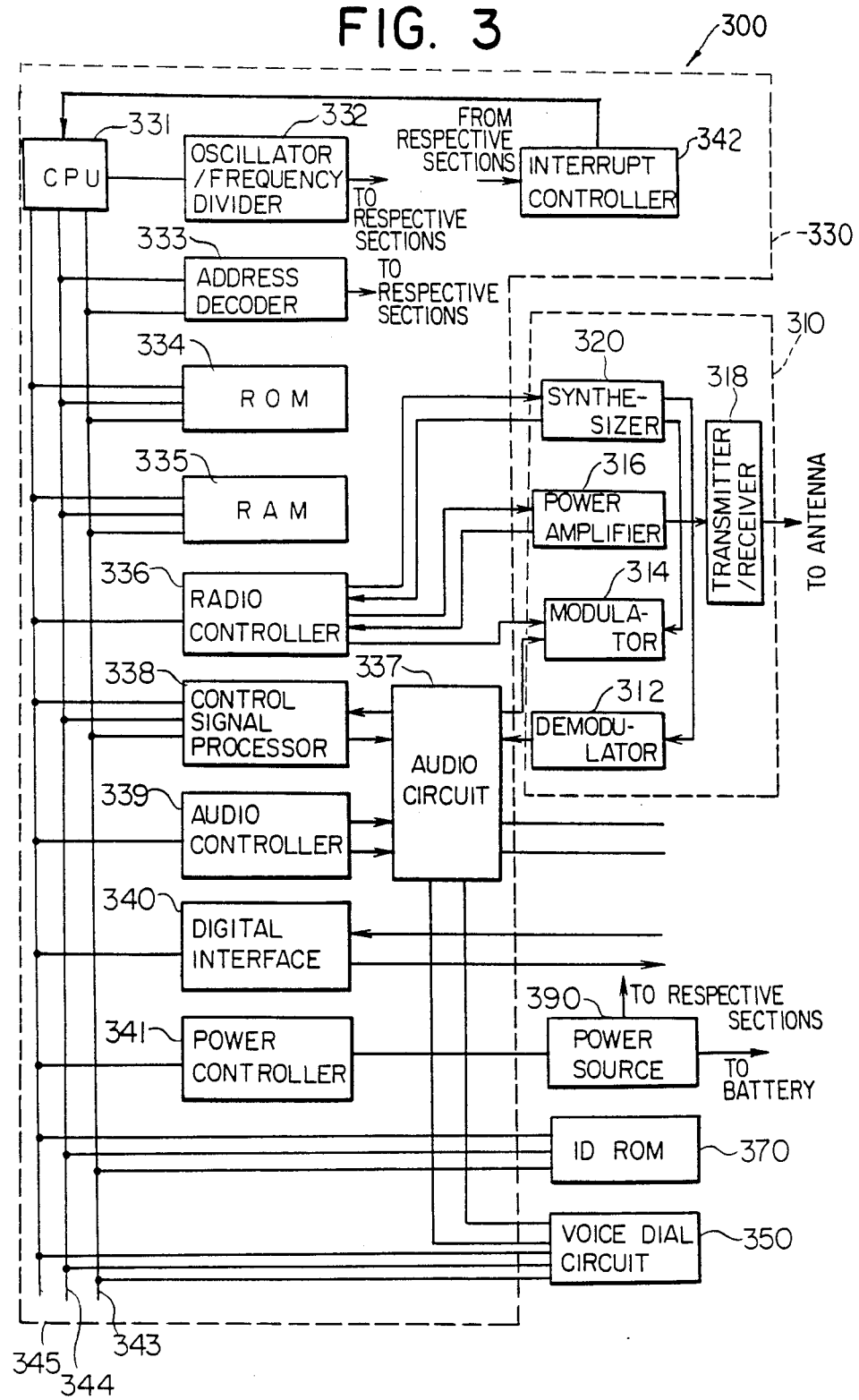

VOICE RECOGNITION SYSTEM USED IN TELEPHONE APPARATUS

This application is a continuation of application Ser. No. 07/198,821, filed May 25,1988, abandoned.

Patent Application of Kuniyoshi MARUI, Takaaki ISHII and Shinya TAKAHASHI

The present invention claims priority of Japanese Patent Applications No. 62-133906 filed on May 29, 1987 and No. 62-180833 filed on July 20, 1987.

FIELD OF THE INVENTION

The present invention relates to a voice recognition system used in a telephone apparatus using radio channels such as a mobile telephone apparatus. More specifically, this invention relates to a voice recognition system used in a radio telephone apparatus capable of making calls without manual dialing.

DESCRIPTION OF THE PRIOR ART

As is well known in the art, mobile telephones are now available for car drivers while they are seated in their cars. These mobile telephones are able to communicate with another mobile telephone or a land line telephone over one of a plurality of radio channels in a mobile telephone system. Such a system is typically referred as a cellular mobile telephone systems.

In the conventional mobile telephone, some arrangement of hands-free operations have been achieved. An example of the arrangements is provided by U.S. Pat. No. 4,558,178 of Yasuda et al. which allows hands-free operation by utilizing a head set. This allows drivers to freely move without holding a handset while communicating with another telephone.

However, according to those mobile telephones with conventional hands-free operations drivers have to operate ten-keys or other keys of an operation panel while driving cars when they initiate a call.

OBJECTS OF THE INVENTION

It is an object of the present invention to provide a radio telephone apparatus adapted to decrease, to the fullest possible extent, the necessity for a user's key manipulation.

It is another object of the present invention to provide a radio telephone apparatus that will operate accurately with the decrease of a user's key manipulation.

BRIEF DESCRIPTION OF THE DRAWINGS

FIG. 3 is a block diagram of a radio unit in the mobile telephone apparatus;

DETAILED DESCRIPTION OF THE PREFERRED EMBODIMENT

A preferred embodiment of the present invention will be described with reference to the accompanying drawings.

Figure 1:
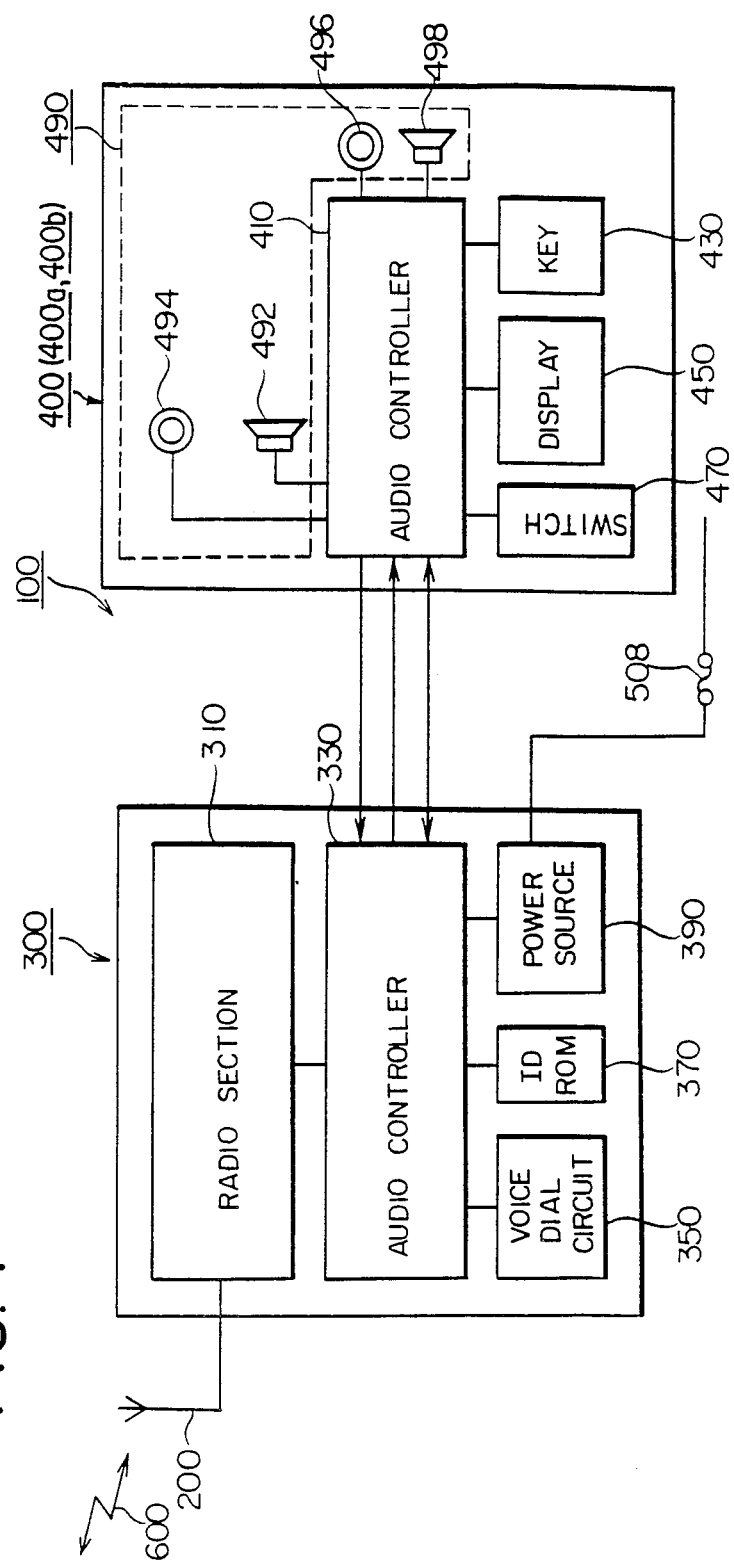
FIG. 1 is a block diagram showing an arrangement of a mobile telephone apparatus according to an embodiment of the present invention.

FIG. 1 is a block diagram showing an arrangement of a mobile telephone apparatus according to an embodiment of the present invention.

Figure 2:
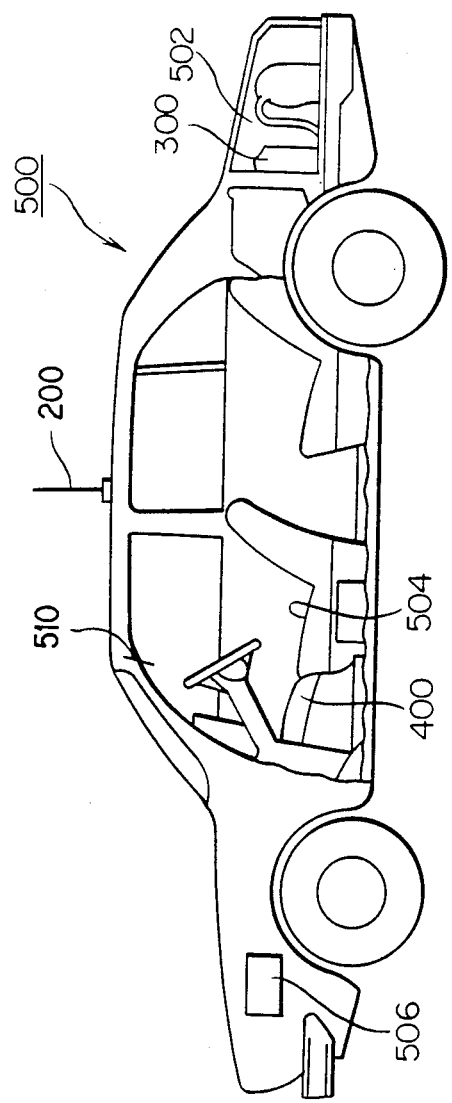
FIG. 2 is a view showing a state wherein the mobile telephone apparatus is mounted in an automobile.

Referring to FIG. 1, a mobile telephone apparatus 100 comprises an antenna 200, a radio unit 300, and a telephone set 400. As shown in FIG. 2, the antenna 200 is mounted on an outer body surface of an automobile 500. The radio unit 300 is mounted inside a trunk 502 of the automobile 500. The telephone set 400 is mounted near a driver's seat 504 inside the automobile 500.

The radio unit 300 mainly comprises a radio section 310 for establishing a radio channel 600 with a base station (not shown) through the antenna 200 and for exchanging signals therewith, an audio controller 330 for controlling the overall operations of the radio unit 300, a voice dial circuit 350 for performing speech recognition and synthesis, an ID ROM 370 for storing ID (Identification Number) and telephone numbers, and a power source 390 for supplying power from a battery 506 (FIG. 2) mounted in the automobile to the above components through a fuse 508.

The telephone set 400 mainly comprises an audio controller 410 for controlling the overall operations of the telephone set 400 in response to an instruction or the like from the audio controller 330, keys 430 for entering a key input, a display 450 for displaying contents, switches 470 for performing various switching operations, and an audio input/output unit 490 for inputting or outputting an audible sound. The telephone set 400 comprises a main unit 400a and a handset 400b. Some components of the audio controller 410 and the switches 470 are incorporated in the main unit 400a. A hands-free microphone 494 mounted on a sunvisor 510 or the like near the driver's seat 504 is connected to the main unit 400a. Some components of the audio controller 410, the keys 430, and the display 450 are mounted in the handset 400b. A handset microphone 496 and a handset receiver 498 which constitute the audio input/output unit 490 are provided to the handset 400b.

FIG. 3 is a block diagram showing a detailed arrangement of the radio unit described above.

Referring to FIG. 3, the radio section 310 comprises a demodulator 312, a modulator 314, a power amplifier 316, a transmitter/receiver 318, and a synthesizer 320. The demodulator 312 demodulates a radio signal received from the base station through the radio channel 600, the antenna 200, and the transmitter/receiver 318. It should be noted that this signal includes an audible sound signal and a control signal. The modulator 314 modulates the audio and control signals and the like from the audio controller 330 and generates a transmission signal.

The power amplifier 316 amplifies the transmission signal from the modulator 314. The amplification of power amplifier 316 is variable, e.g., 8-step variable. The transmitter/receiver 318 sends, to the demodulator 312, the signals received through the radio channel 600 and the antenna 200 and, to the antenna 200, the signals from the modulator 314 and the power amplifier 316. The synthesizer 320 comprises a channel selection local oscillator and specifies a frequency in which signals are demodulated by the demodulator 312 and a frequency in which signals are modulated by the modulator 314. About 666 channels are available for the synthesizer 320.

The audio controller 330 comprises a CPU 331, an oscillator/frequency divider 332, an address decoder 333, a ROM 334, a RAM 335, a radio controller 336, an audio circuit 337, a control signal processor 338, an audio controller 339, a digital interface 340, a power controller 341, and an interrupt controller 342. Reference numeral 343 denotes an 8-bit data bus; 344, an address bus; and 345, a control bus. The CPU 331 controls the operations of the audio controller 330. The oscillator/frequency divider 332 supplies clock signals to the CPU 331 and divides the clock signals so as to supply the frequency-divided pulses as timing pulses to each section of the mobile telephone apparatus. The address decoder 333 outputs predetermined operation signals to the components in response to instruction signals from the CPU 331. The ROM 334 stores various programs required for operations of the CPU 331. The RAM 335 stores various kinds of data during processing of the CPU 331. The radio controller 336 controls the radio section 310 in response to an instruction from the CPU 331. For example, the radio controller 336 sends to the synthesizer 320 signals indicative of a frequency available for the synthesizer 320, to the power amplifier 316 signals indicative of an amplification available for the power amplifier 316, and to the modulator 314 signals indicative of parameters for modulation in the modulator 314. The radio controller 336 receives a step-out signal from the synthesizer 320 and output power detection signals from the power amplifier 316 and supplies them to the CPU 331, thereby preventing operation errors. The audio circuit 337 extracts control signals and audio signals from the received signals demodulated by the demodulator 312 and supplies the control signals to the control signal processor 338 and the audio signals to the voice dial unit 350 and the telephone set 400. The audio circuit 337 also supplies, to the modulator 314, the control signal from the control signal processor 338 and audio signals from the telephone set 400 and the voice dial unit 350. It should be noted that the audio circuit 337 also arranges the waveform of the control signal to be sent to the control signal processor 338 in a certain waveform and filters the control signal to be supplied to the modulator 314. The control signal processor 338 acquisites bit and frame synchronization with the control signal from the audio circuit 337. Maintaining the acquisited syncronization, the control signal processor 338 converts the serial control signals including control data received from a base station into parallel signals and converts the parallel control data signals to be transmitted to a base station into serial signals, which are sent to the audio circuit 337. The audio controller 339 controls the audio circuit 337. For example, under the control of the audio controller 339, the audio circuit 337 selectively applies the received signals from the demodulator 312 to the control signal processor 338, the voice dial circuit 350, or the telephone set 400 and selectively receives the signals from the control signal processor 338, the voice dial circuit 350, or the telephone set 400. The digital interface 340 interfaces data communication between the radio unit 300 and the telephone set 400. The power controller 341 controls the power source 390. For example, the power controller 341 sets a voltage supplied from the battery 506 to the power source 390 to a predetermined level. The voltage having the predetermined level is supplied to the respective components. The interrupt controller 342 interrupts the CPU 331 in response to an interrupt signal from each component.

Figure 4A:
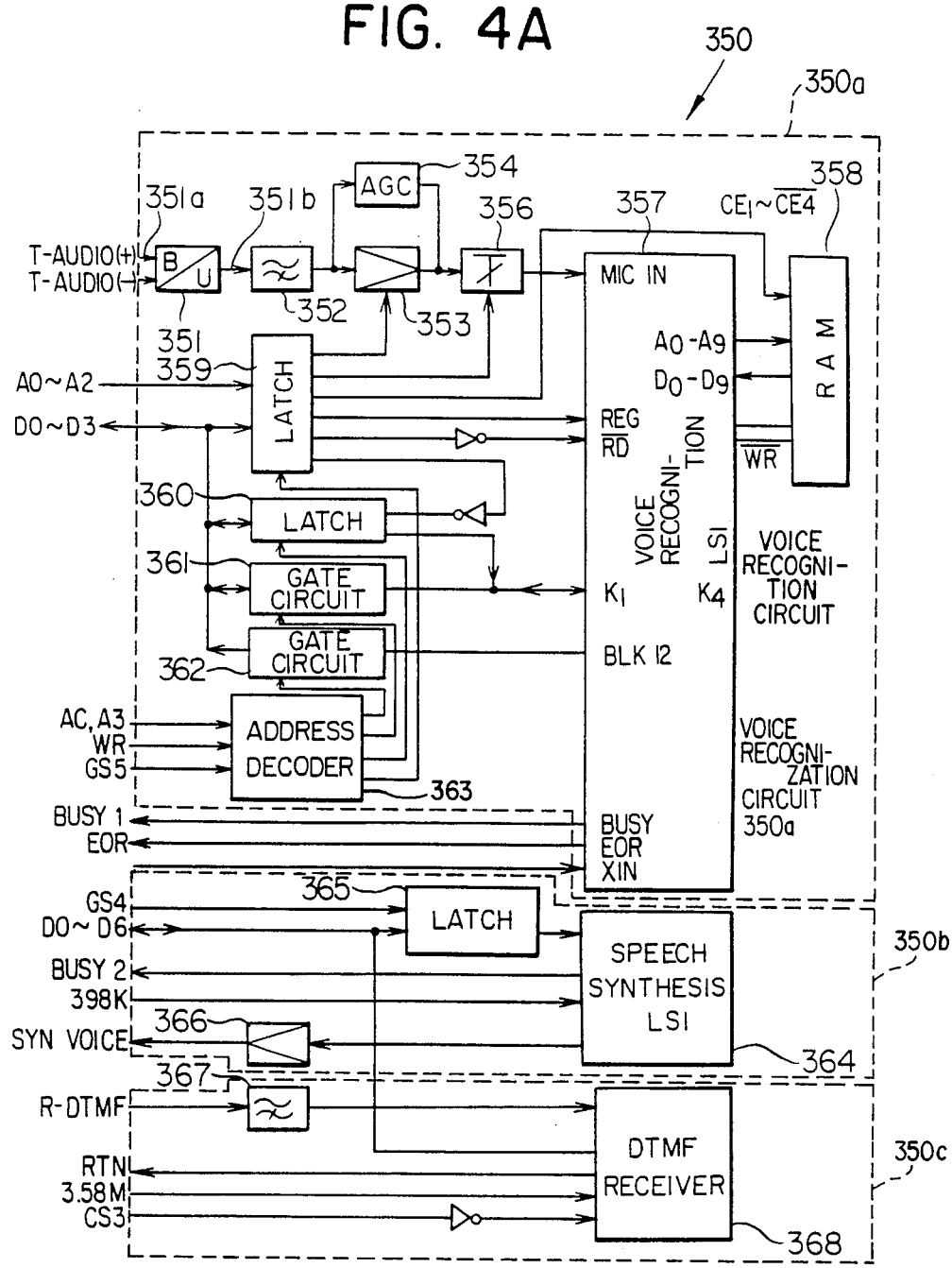
FIG. 4A is a block diagram of a voice dial circuit in the radio unit in the mobile telephone apparatus.

FIG. 4A is a detailed block diagram of the voice dial circuit 350 shown in FIGS. 1 and 3.

Referring to FIG. 4A, the voice dial circuit 350 comprises a voice recognition circuit 350a for recognizing the words spoken by a human, a speech synthesis circuit 350b for synthesizing voice messages, and a DTMF receiver 350c for receiving DTMF signals.

The speech recognition circuit 350a comprises a balance/unbalance converter 351 (referred to as B/U converter hereinafter) connected to a balance line 351a, a high-pass filter 352, an amplifier 353, an AGC circuit 354, an attenuator 356, a voice recognition LSI 357, a RAM 358, latches 359 and 360, gate circuits 361 and 362, and an address decoder 363.

Figure 4B:
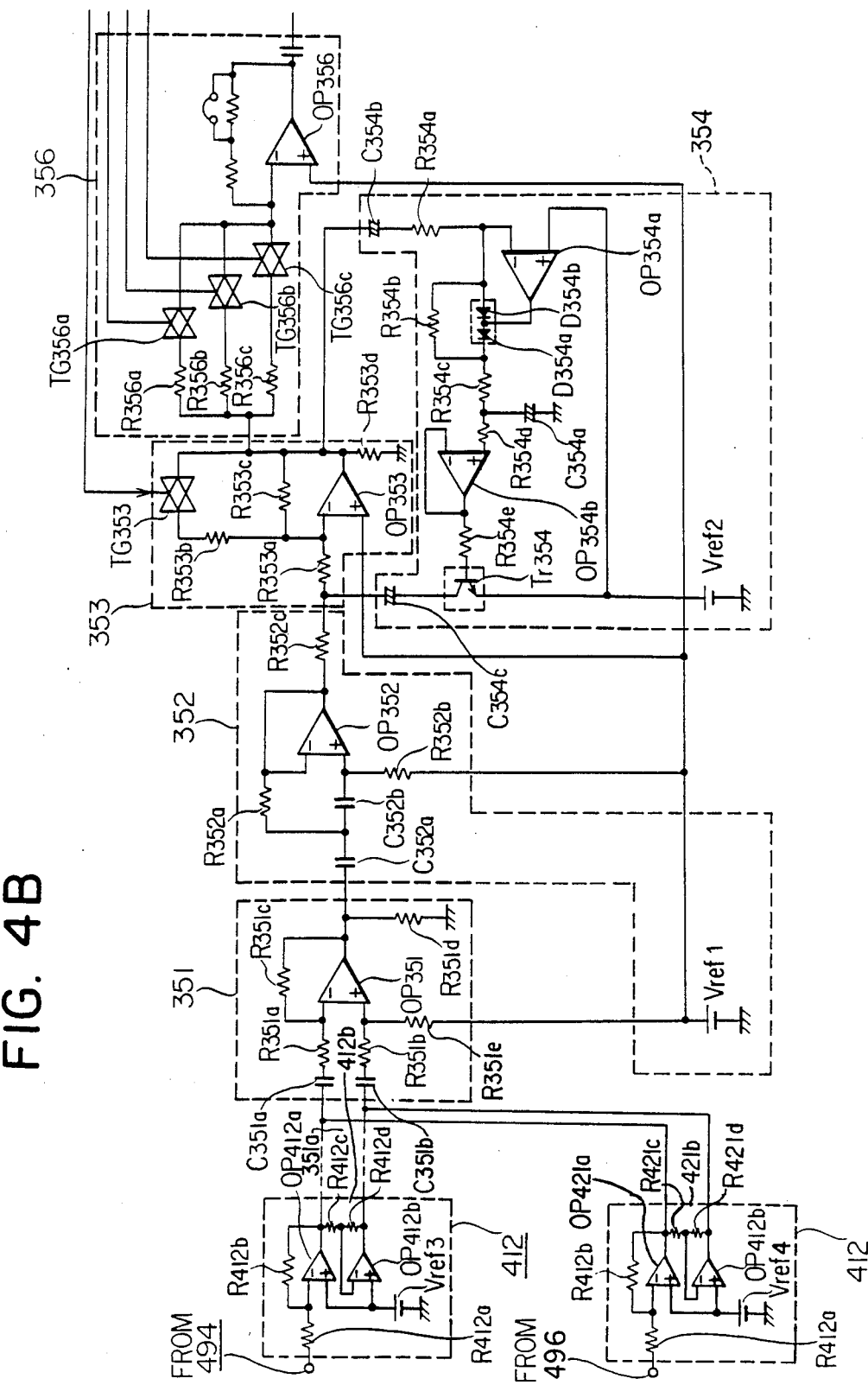
FIG. 4B is a circuit diagram of part of a speech recognition circuit in the voice dial circuit of the mobile telephone apparatus.
Figure 7:
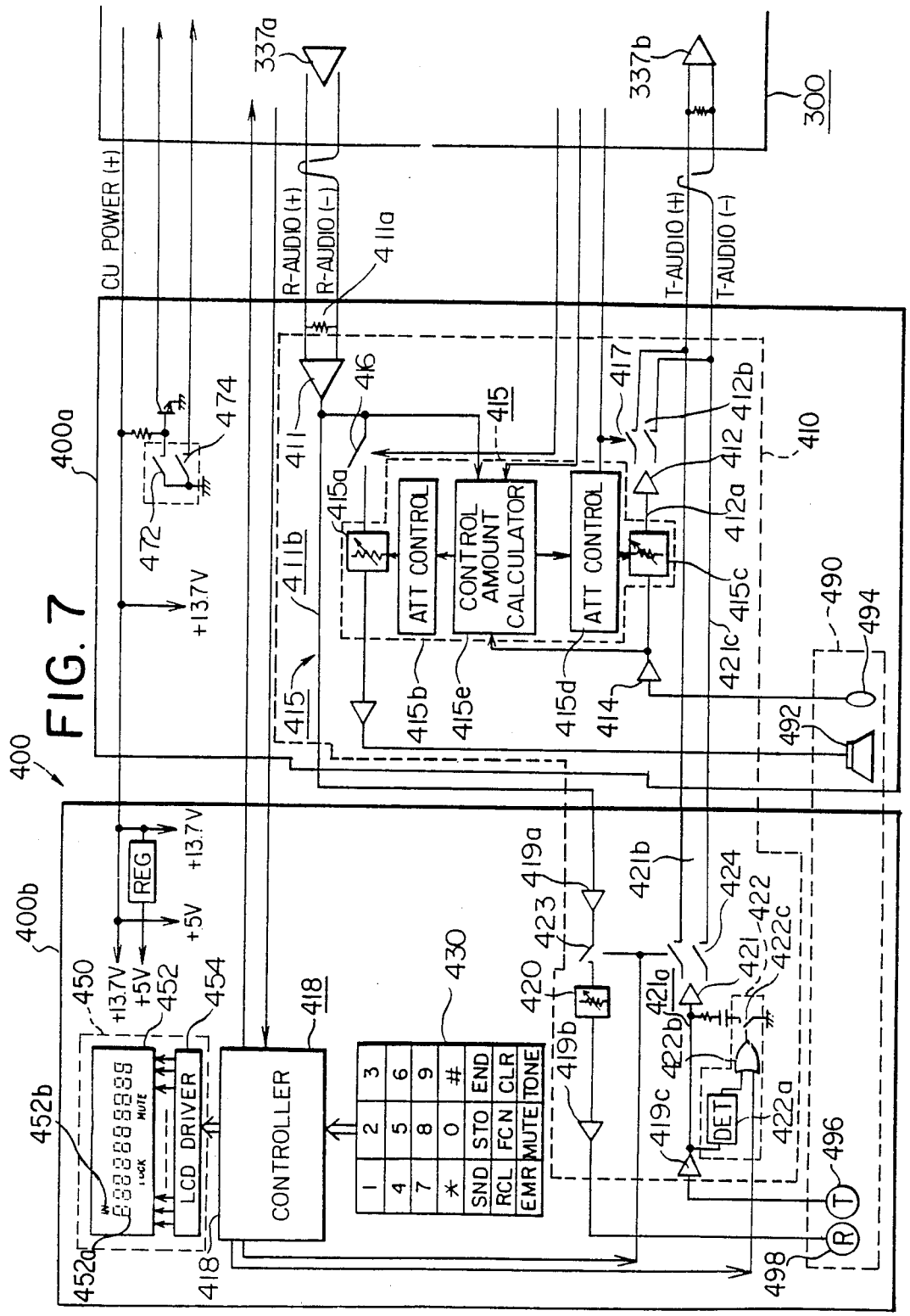
FIG. 7 is a circuit diagram of a telephone set in the mobile telephone apparatus.

FIG. 4B is a detailed circuit diagram showing one end of the balance line 351a and the part of the speech recognition circuit 350a including the other end of the balance line 351a. Referring to FIG. 4B and FIG. 7, there are B/U converter 351 and unbalance/balance converters 412 and 421 (referred to as U/B converter hereinafter) at each end of the balance line 351a. The B/U converter 351 comprises a differential amplifier circuit which includes an operational amplifier OP351, resistors R351a, R351b, R351c, R351d, and R351e, capacitors C351a and C351b, and reference voltage source $V_{ref}1$. The U/B converters 412 and 421 are arranged in the output stage of each of the hands-free microphone 494 and the handset microphone 496. The U/B converter 412 comprises operational amplifiers OP412a and OP412b, resistors R412a, R412b, R412c, R412d, and a reference voltage source $V_{ref}3$. The U/B converter 421 also comprises identical components. The voice signals from the hands-free microphone 494 or handset microphone 496 are transmitted through a balance line 351a (412b or 421b) between the U/B converter and the B/U converter 351 or between the U/B converter 421 and the B/U converter 351. The signals on the balance line 351a consisting of two transmission lines are converted to signals on the unbalance line 351b substantially consisting of one transmission line. The converted signals are used as the speech signals for the speech recognition circuit 350a. In this case, on each transmission line of the balance line 351a (412b or 421b) noise appears substantially at the same time and at the same amplitude each other. This noise is called common mode noise. According to a feature of this invention, this common mode noises appearing on the balance line 351a (412b or 421b), through which the speech signals are transmitted, is cancelled and eliminated at the B/U converter 351. Therefore, recognition errors caused by such common mode noise can be prevented, and the recognition rate can be increased.

The high-pass filter 352 comprises an operational amplifier OP352, resistors R352a, R352b and R352c, capacitors C352a and C352b, and a reference voltage source $V_{ref}1$. The cutoff frequency fc of this high-pass filter 352 is arranged at about 600 Hz. According to a feature of this invention, the high-pass filter eliminates the low-frequency component out of both the signal input from the hands-free microphone 494 and the handset microphone 496. This low-frequency component is due to the low-frequency noise existing in the automobile 500. These low-frequency components are eliminated, and the filtered speech signal is subjected to speech recognition, thereby preventing an operation error caused by noise and a recognition error. Therefore, the recognition rate can be increased.

The amplifier 353 comprises an operational amplifier OP353, a transmission gate TG353, and resistors R353a, R353b, R353c, and R353d, and amplifies the output of the high-pass filter 352. The gain of the amplifier 353 is controlled by the audio controller 330 as follows. When the hands-free microphone 494 is available for the input of operator's voice in the telephone set 400, the gain of the amplifier 353 is selected to be lower than the gain of the amplifier 353 in the case when the handset microphone 496 is available. The CPU 331 in the audio controller 330 has a status flag based on the control signal from a hook switch 472 (to be described in detail later) for indicating an onor off-hook state of the handset 400b. For example, when the handset 400b is set in the on-hook state, i.e., when the hands-free microphone 494 is used, the status flag is set to supply the predetermined control signals from the CPU 331 to the control side of the transmission gate TG353 through the digital interface 340 and the latch 359. The amount of noise generated by the automobile 500 is larger during the use of the hands-free microphone 494 than during the use of the handset microphone 496. The gain of the amplifier 353 is reduced during the use of the hands-free microphone 494. Therefore, an operation error caused by noise and the resulting recognition error can be prevented.

The AGC circuit 354 comprises operational amplifiers OP354a and OP354b, a transistor Tr354, resistors R354a, R354b, R354c, R354d, and R354e, capacitors C354a, C354b, and C354c, diodes D354a and D354b, and a reference voltage source $V_{ref}2$. The operational amplifier OP354a with a voltage from the reference voltage source $V_{ref}2$ compares a speech signal amplified by the amplifier 353 to produce a difference signal. The difference signal is rectified by the diodes D354a and D354b, and the capacitor C354a. The rectified signal is applied to the base (control) side of the transistor Tr354 by way of a voltage follower circuit comprising the operational amplifier OP354b. The input level of the amplifier 353 may be controlled by current signals applied to the base of the transistor Tr354. More specifically, the gain of the speech signal amplified by the amplifier 353 is controlled by the AGC circuit 354. The speech signal having a predetermined level can be output from the amplifier 353 regardless of the magnitude of the speech signal from the high-pass filter 352, thereby widening the dynamic range and absorbing differences in speech levels between individual users or subscribers. The speech levels of the individual subscribers regardless of the magnitude of the speech signal may be output at a predetermined level by amplifier 353, thereby increasing the recognition rate without further processing. The attenuator 356 includes an operational amplifier OP356, transmission gates TG356a, TG356b and TG356c, and resistors R356a, R356b, and R356c. The speech signal from the amplifier 353 is input to the operational amplifier OP356 through a first route of a series circuit consisting of the transmission gate TG356a and the resistor R356a, a second route of a series circuit consisting of the transmission gate TG356b and the resistor R356b, and a third route of a series circuit consisting of the transmission gate TG356c and the resistor R356c. The output from the operational amplifier OP356 serves as the speech signal input to the speech recognition LSI 357. ON/OFF instruction signals from the CPU 331 in the audio controller 330 are respectively input to the transmission gates TG356a, TG356b, and TG356c through the latch 359. The transmission gates TG356a, TG356b, and TG356c are turned on/off in response to the ON/OFF instruction signals. The attenuation rate of the attenuator 356 is controlled by the audio controller 330, and the speech signal having a controlled attenuation rate is input to the speech recognition LSI 357. At the time of speech recognition prior to voice dialing (to be described later), speech inputs having different levels can be registered. The speech recognition LSI 357 recognizes the speech signal. The RAM 358 stores data of words to be recognized by the speech recognition LSI 357.

Figure 5:
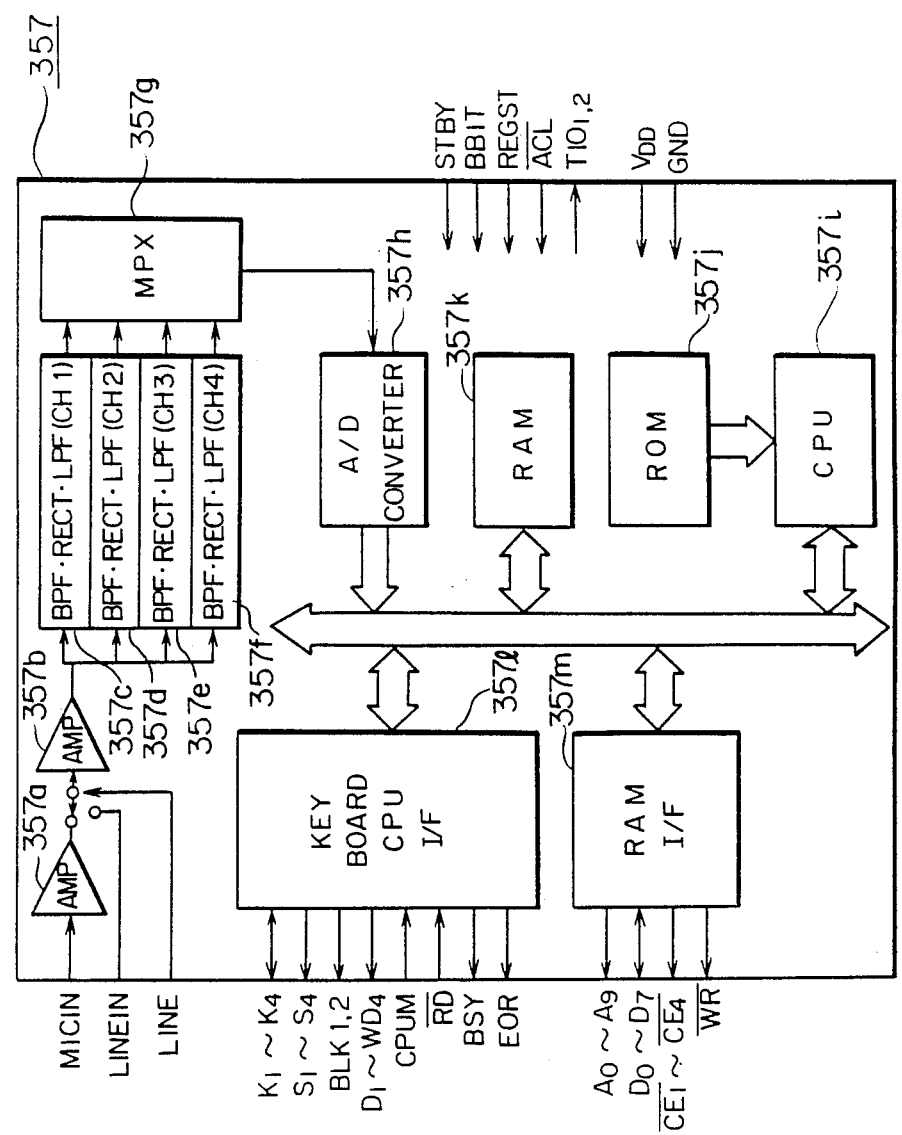
FIG. 5 is a block diagram of an audio recognition LSI in the voice dial circuit in the radio unit in the mobile telephone apparatus.

FIG. 5 is a detailed block diagram of the speech recognition LSI 357.

Referring to FIG. 5, the speech recognition LSI comprises two amplifiers 357a and 357b, four band-pass filters 357c, 357d, 357e, and 357f, a multiplexer 357g, an A/D converter 357h, a CPU 357i, a ROM 357j, a RAM 357k, a CPU interface 357l, and a RAM interface 357m.

The amplifiers 357a and 357b amplify the input speech signals. The gain value of each of the amplifiers 357a and 357b is, for example, 10. The band-pass filters 357c, 357d, 357e, and 357f filter the amplified speech signals. The center frequencies of the band-pass filters 357c, 357d, 357e, and 357f are respectively 0.5 kHz, 1 kHz, 2 kHz, and 4 kHz. The multiplexer 357g multiplexes the speech signals filtered through the band-pass filters 357c, 357d, 357e, and 357f. The A/D converter 457h converts the multiplexed speech signal into a digital signal. The CPU 357i controls the overall operations of the CPU 357i. The RAM 357k stores various kinds of data during control of the CPU 357i. The CPU interface 357l interfaces communication with the audio controller 330. The RAM interface 357m interfaces with the RAM 358. At the time of speech recognition, the sampled, quantized, coded speech signals supplied through the amplifiers 357a and 357b, the band-pass filters 357c, 357d, 357e, and 357f, the multiplexer 357g, and the A/D converter 357h are compared with word data preregistered in the RAM 358 through the RAM interface 357m and to be recognized. In order to register words to be recognized, data of the sampled, quantized, coded speech signals are stored in the RAM 358 through the RAM interface 357m.

The speech synthesis circuit 350b comprises a speech synthesis LSI 364 for generating a predetermined speech pattern on the basis of the data sent from the audio controller 330, a latch 365, and an amplifier 366 for amplifying the output speech pattern.

Figure 6:
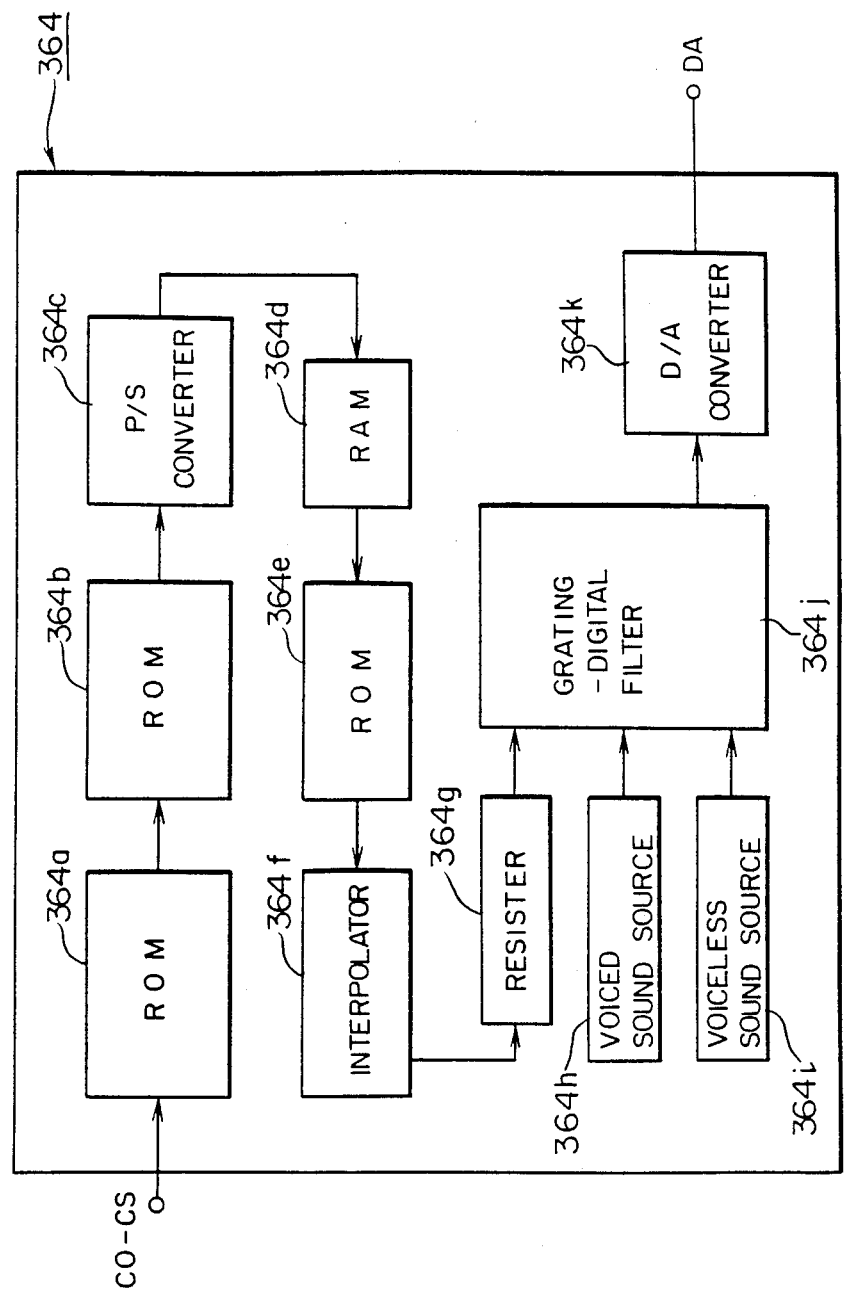
FIG. 6 is a block diagram of a speech synthesis LSI in the voice dial circuit in the radio unit in the mobile telephone apparatus.

FIG. 6 is a detailed block diagram of the speech synthesis LSI 364.

Referring to FIG. 6, the speech synthesis LSI 364 comprises a ROM 364a indirectly addressed by a predetermined code, a ROM 364b for storing speech parameters, a parallel/serial converter 364c for reading out speech parameters, a RAM 364d for storing one-frame parameters, a ROM 364e for nonlinearly decoding parameters, an interpolator 364f for interpolating parameters every predetermined interval, a register 364g for storing parameters and performing arithmetic operations, a voiced sound source 364h, a voiceless sound source 364i, a grating digital filter 364j, and a D/A converter 364k.

The DTMF receiver 350c comprises a high-pass filter 367 and a DTMF receiver 368. The DTMF receiver 368 receives a DTMF signal included in the speech signal through the highpass filter 367 and recognizes the DTMF signal.

FIG. 7 is a detailed view of the telephone set 400 described above.

Referring to FIG. 7, the main unit 400a mainly comprises the audio controller 410, the speech input/output unit 490, and a switch unit 470. The controller 410 comprises a B/U converter 411, a U/B converter 412, amplifiers 413 and 414, and echo canceler 415, and switches 416 and 417. The speech input/output unit 490 comprises the hands-free microphone 494 and the loudspeaker 492. The switch unit 470 comprises the hook switch 472 and the on/off switch 474.

The B/U converter 411 converts the speech signal sent from the audio circuit 337 in the radio unit 300 through the balance line 411a into a signal on the unbalance line 411b. The speech signal converted into the signal on the unbalance line 411b is amplified by the amplifier 411b and is output at the loudspeaker 492. Since the speech signal output from the audio circuit in the radio unit is the signal on the unbalance line, the speech signal is converted into the signal on the balance line by the U/B converter 337a arranged in the immediate output stage of the audio circuit. The speech signal input at the hands-free microphone 494, amplified by the amplifier 414, and appearing on the unbalance line 412a is converted into a signal on the balance line 412b. The speech signal converted into the signal on the balance line 412b is sent to the audio circuit 337 through the balance line 412b. The speech signal input to the audio circuit 337 in the radio unit 300 is a signal on the unbalance line, so that the speech signal is converted into a signal on the unbalance line by the B/U converter 337b arranged in the immediate output stage of the audio circuit 337. The echo canceler 415 comprises an attenuator 415a for attenuating the speech signal input from the B/U converter 411 to the amplifier 413, an attenuation controller 415b for controlling an attenuation rate of the attenuator 415a, an attenuator 415c for attenuating the speech signal input from the amplifier 414 to the U/B converter 412, an attenuation controller 415d for controlling an attenuation rate of the attenuator 415c, and a control amount calculator 415e for calculating control amounts of the attenuation controllers 415b and 415d on the basis of the speech signals on the respective lines. The switch 416 is operated to determine whether the speech signal from the B/U converter 411 is output from the loudspeaker 492. The switch 417 is operated to determine whether the speech signal from the hands free microphone 494 is sent to the audio circuit 337 in the radio unit 300. The operations of the switches 416 and 417 are performed on the basis of control signals output from the audio controller 330. The hook switch 472 detects the on- or off-hook state of the handset 400b. The detected signal is sent to the audio controller 330 in the radio unit 300. The on/off switch 474 performs overall ON/OFF operation of the mobile telephone apparatus 100. A switching signal from the switch 474 is sent to the audio controller 330 in the radio unit 300.

The handset 400b comprises the audio controller 410, the display 450, the key unit 430, and the speech input/output unit 490. The audio controller 410 comprises a controller 418, amplifiers 419a, 419b, and 419c, an attenuator 420, a U/B converter 421, a speech switch unit 422, and switches 423 and 424. The display 450 comprises a liquid crystal display 452 and an LCD driver 454. The key unit 430 comprises a plurality of key pads. The speech input/output unit 490 comprises the handset microphone 496 and the handset receiver 498. The controller 418 controls the overall operations of the handset 400b on the basis of control signals sent from the audio controller 330 in the radio unit 300. At the same time, the controller 418 sends control signals or the like input from the key unit 430 to the audio controller 330 in the radio unit 300. The amplifiers 419a and 419b amplify the speech signal sent from the B/U converter 411 in the main unit 400a. The attenuator 420 attenuates the speech signals amplified by the amplifiers 419a and 419b. The speech signal output through the amplifier 419a, the attenuator 420, and the amplifier 419b is output from the handset receiver 498. The amplifier 419c amplifies the speech signal input from the handset microphone 496. The U/B converter 421 converts the amplified speech signal on the unbalance line 421a into a signal on the balance line 421b. The speech signal converted into the signal on the balance line 421b is sent to the audio circuit 337 through the balance line 421b and the balance line 421c on the unit 400a. The switch 423 is operated to determine whether the speech signal from the B/U converter 411 is to be output from the handset receiver 498. The switch 424 is operated to determine whether the speech signal from the handset microphone 496 is to be output to the audio circuit 337 in the radio unit 300. The operations of the switches 423 and 424 are performed on the basis of the control signals output from the controller 418 and are interlocked with the switches 416 and 417 in the main unit 400a. In the standby mode of the mobile telephone apparatus 100, all the switches 416, 417, 423, and 424 are turned off. In the sound generation mode for a key input, the switch 416 is turned on, and the switches 417, 423, and 424 are turned off. When the handset 400b is used for communication in the off-hook state, the switches 423 and 424 are turned on, and the switches 416 and 417 are turned off. When the handset 400b is used for communication in the on-hook state, the switches 416 and 417 are turned on, and the switches 423 and 424 are turned off. The speech switch unit 422 comprises a level detector 422a, an OR gate 422b, and a switch 422c. The level detector 422a detects a signal level of a speech signal input to the handset microphone 496. If the signal level is less than a predetermined value, the level detector 422a generates a signal of level "L". However, if the signal level exceeds the predetermined value, the level detector 422a generates a signal of level "H". The OR gate 422b receives an output signal from the level detector 422a and a predetermined control signal output from the controller 418 and generates an OR signal. The switch 422c is turned on in response to the signal of level "L" from the OR gate 422b, and the speech signal line 421a is grounded. The speech signal from the handset microphone 496 is not transmitted to the audio circuit 337, and the handset microphone 496 is set in the OFF state. The switch 422c is turned off in response to the signal of level "H" from the OR gate 422b, and the handset microphone 496 is set in the ON state. The control signal input from the controller 418 to one input terminal of the OR gate 422b is set at level "L" in the standby mode and during normal communication and at level "H" in the voice recognition mode allowing voice dialing (to be described later). Therefore, when no voice is input to the handset microphone 496 in the busy state, the handset microphone 496 is set in the OFF state. Therefore, noise in the automobile 500 is not sent to the other party, and comfortable communication can be achieved. In the recognition mode for voice dialing, the handset microphone 496 is normally set in the ON state and is operated independently of switching of the level detector 422a. In order to prevent discomfort caused by frequent switching operations according to voice inputs in the busy state, the level detector 422a has a capacitor (not shown) for setting a predetermined constant. In a conventional arrangement, when voice dialing is performed, the level of the start word of the speech input is decreased by the capacitor to cause incomplete voice dialing. In the mobile telephone apparatus 100, since the handset microphone 496 is always kept in the ON state in the recognition mode for allowing voice dialing, as described above, the conventional problem can be solved and accurate dialing can be assured. The liquid crystal display 452 comprises a numerical display element 452a having several display digit positions and a display element 452b for displaying various functions. The LCD driver 454 drives the liquid crystal display 452 under the control of the controller 418 to display predetermined contents. The key unit 430 includes key pads such as numerical keys "0" to "9" as well as function keys "*", "#", "TONE". When a desired key pad is depressed, the depressed pad is detected by the controller 418.

Operations of the mobile telephone apparatus 100 having the above arrangement will be described in detail with reference to the flow charts.

Figure 8:
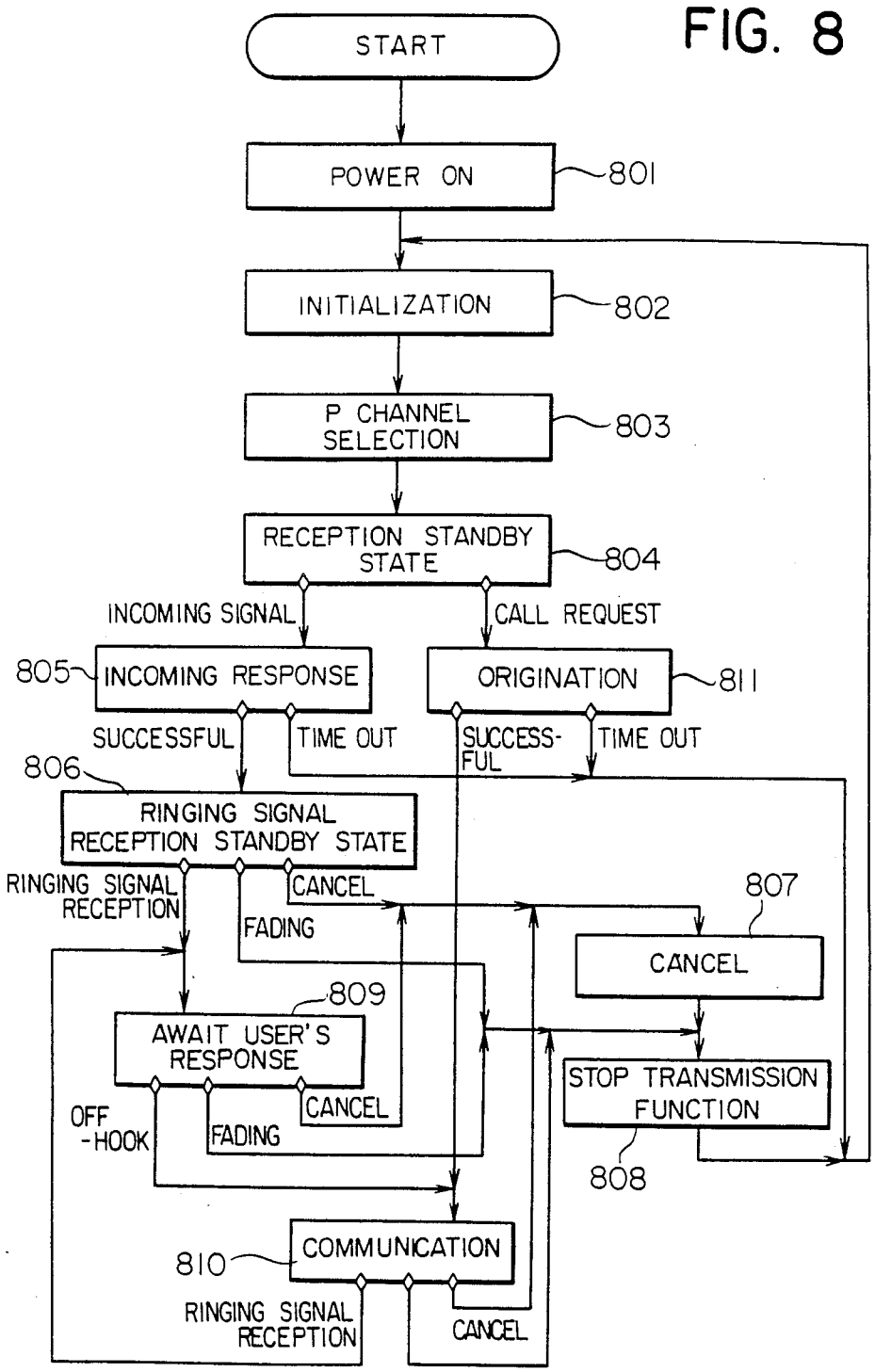
FIG. 8 is a flow chart for explaining a connection control operation in the mobile telephone apparatus.

A connection control operation of the mobile telephone apparatus 100 will be described with reference to FIG. 8.

When the ON/OFF switch 474 in the switch unit 470 in the telephone set 400 is turned on, the respective components are powered by the power source 390 (step 801).

Figure 9:
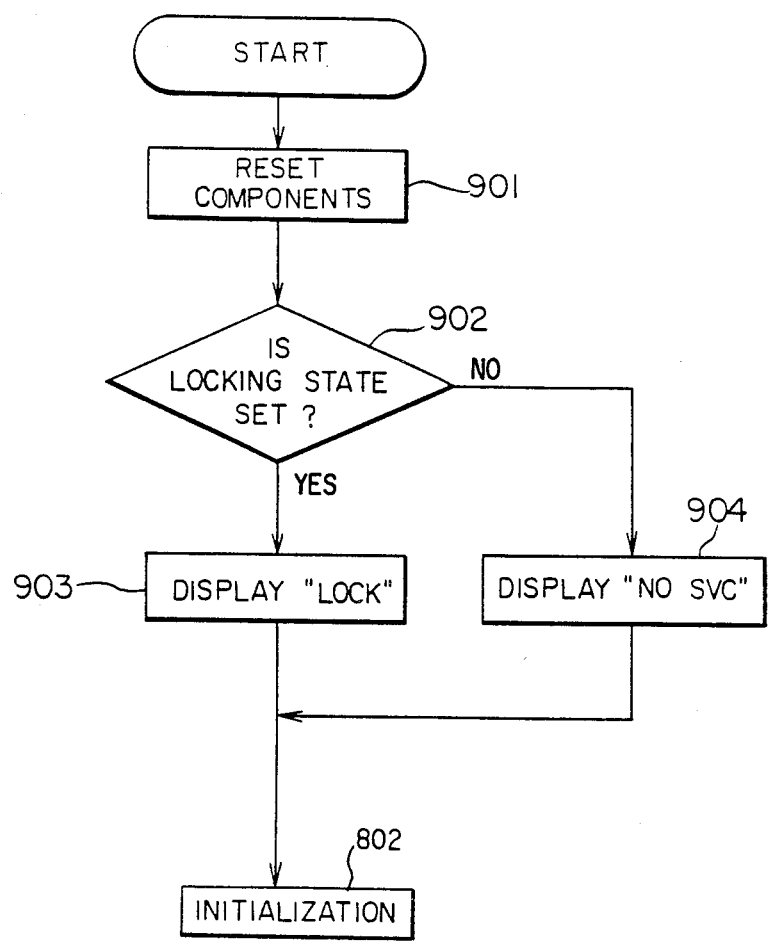
FIG. 9 is a flow chart for aiding in the description on the operation of the power source. connection the mobile telephone apparatus.

FIG. 9 is a detailed flow chart for explaining the above operation.

When the apparatus is powered, the components are reset (step 901). When resetting of the components is completed, the entire screen of, e.g., the liquid crystal display 452 flickers. Alternatively, a predetermined "beep tone" is generated at the loudspeaker 492 to signal to the user that resetting has been completed.

Thereafter, whether or not a locking state is set is determined (step 902). The locking state is defined as a state wherein no subsequent operations can be performed unless a predetermined key operation in the key unit 430 is performed, thereby preventing illegal use of the apparatus.

When the locking state is set, the liquid crystal display 452 displays "LOCK" (step 903). Otherwise, the liquid crystal display 452 displays "NO SVC" (step 904).

When the above resetting operations are completed, initialization is started (step 802).

Figure 10:
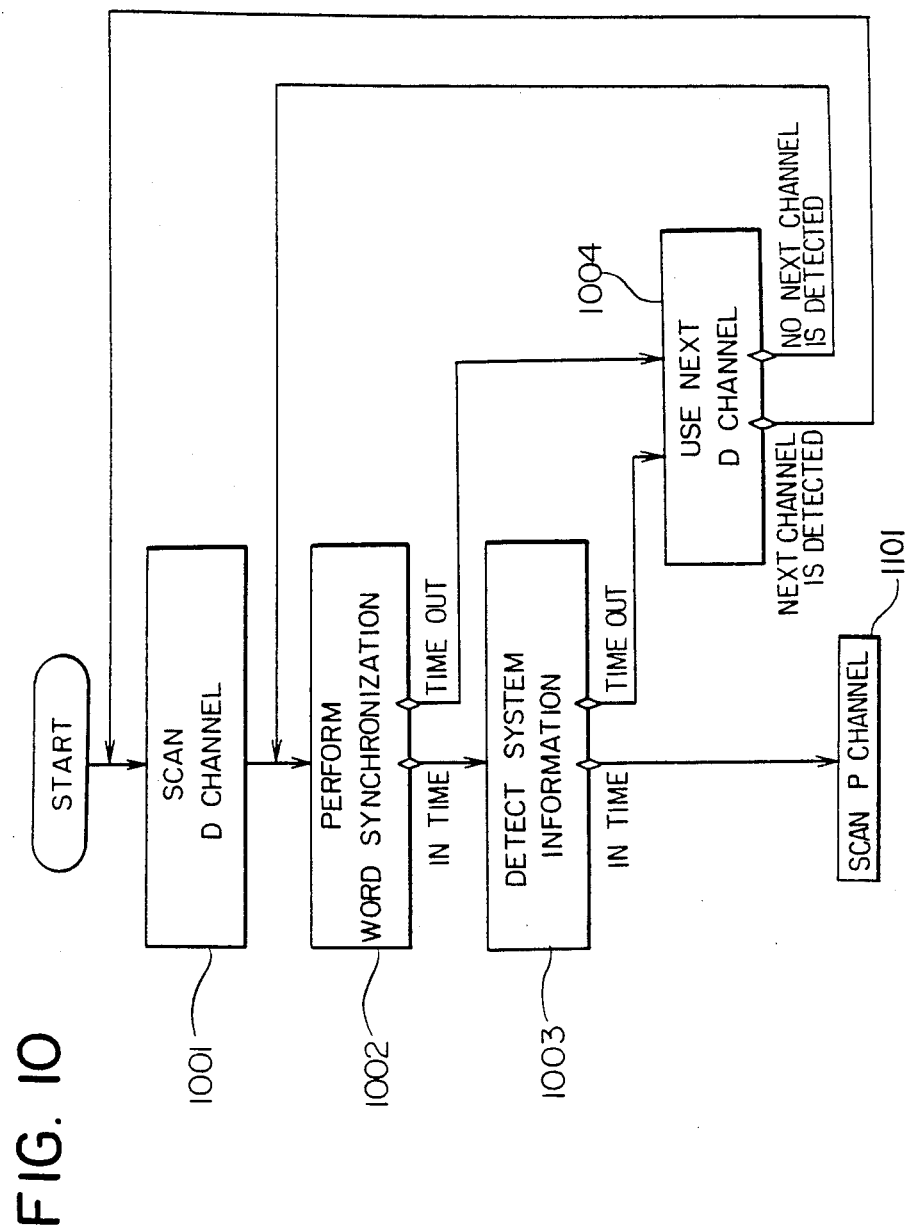
FIG. 10 is a flow chart for explaining initialization in the connection control operation in the mobile telephone apparatus.

FIG. 10 is a detailed flow chart of initialization.

More specifically, the audio controller 330 in the radio unit 300 causes the demodulator 312 to scan predetermined control channels (to be referred to as D channels hereinafter) to obtain the information indicative of electric field intensity of the received signals over each channel (step 1001). The channel having the strongest electric field intensity is selected from the D channels and the apparatus is ready for receiving the D channel having the strongest electric field intensity. In this case, information representing the D channel having the second strongest intensity is also obtained.

Thereafter, the control signal processor 338 performs bit and frame synchronization operations with the D channel currently received thereby (step 1002). System information is then detected from this D channel (step 1003).

If the word synchronization or system information reception is not performed when a predetermined period of time has elapsed, the D channel having the second strongest intensity is used to repeat the above operation (step 1004). In this case, if word synchronization or system information reception is not performed again when the predetermined period of time has elapsed, the demodulator scans the D channels again.

Figure 11:
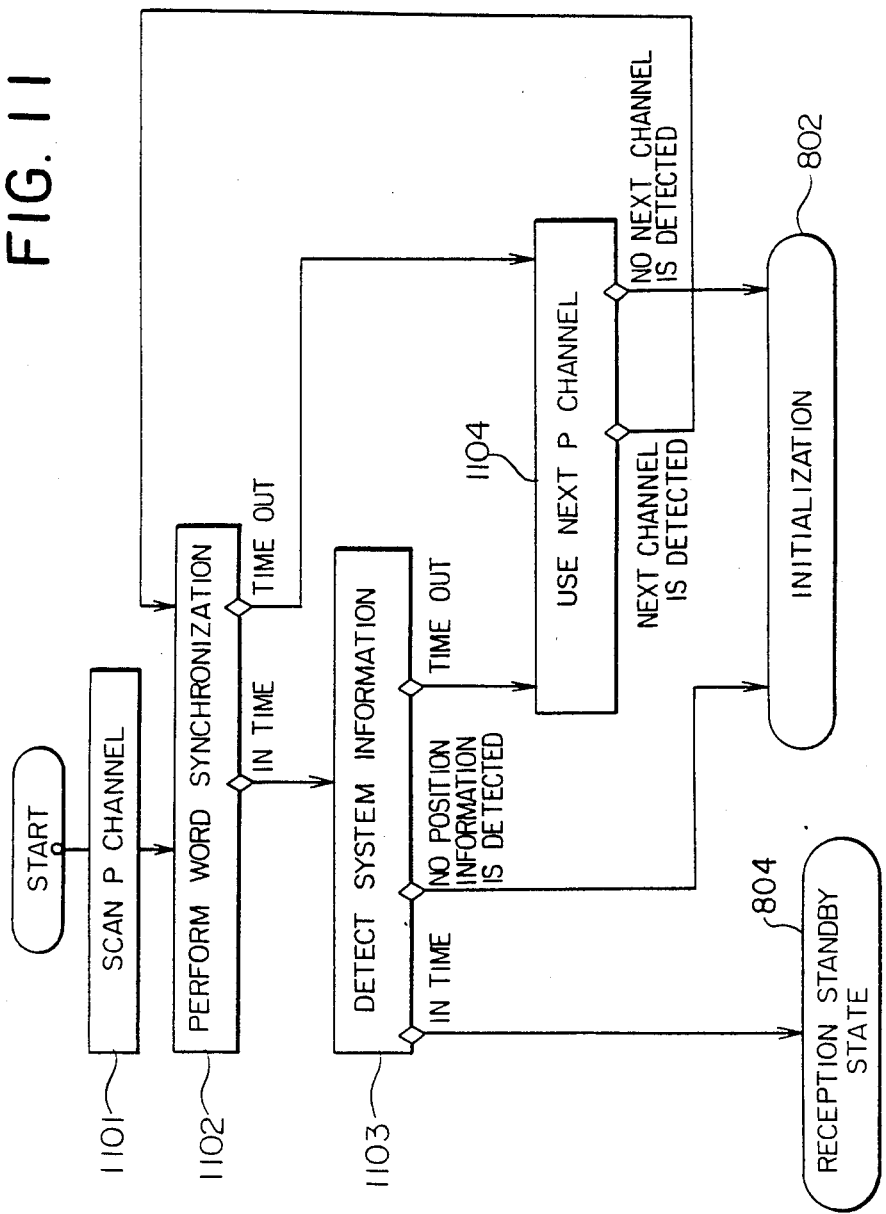
FIG. 11 is a flow chart for explaining an operation after initialization in the connection control operation in the mobile telephone apparatus.

When the above initialization operations are completed, scanning similar to the above scanning operation is performed for control channels (to be referred to as P channels hereinafter) for receiving an incoming signal, as shown in FIG. 11 (step 803).

The audio controller 330 in the radio unit 300 causes the demodulator 312 to scan each P channel (step 1101) to obtain the information indicative of electric field intensity of the received signals. The apparatus is ready for receiving information through the P channel of the strongest electric field intensity. In this case, information of the P channel having the second strongest intensity is also obtained.

Thereafter, the control signal processor 338 performs bit and frame synchronization operations, i.e., the word synchronization for the P channel currently received thereby (step 1102), and system information is obtained by way of the P channel (step 1103).

If the word synchronization or system information reception is not performed when a predetermined period of time has elapsed, the operation similar to the one described above is performed for the P channel having the second strongest intensity (step 1104). In this case, when word synchronization or system information reception is not performed again within the predetermined period of time, initialization is resumed (step 802). If position information is not obtained from system information, initialization is also resumed (step 802).

The above connection control operations set the apparatus in the standby mode (step 804).

In the standby mode, when an incoming signal is received through the P channel, an acknowledge signal is sent back through a predetermined channel (step 805). At the same time, scanning of control channels (to be referred to as A channels hereinafter) for receiving control signals from the base station is performed in the same manner as in D and P channels.

The audio controller 330 in the radio unit 300 causes the demodulator 312 to scan each A channel to obtain the information indicative of electric field intensity of the received signal. The apparatus is then ready for receiving information through the A channel having the strongest electric field intensity. Thereafter, the control signal processor 338 performs bit and frame synchronization operations, i.e., word synchronization. When a speech channel designation signal is received through this A channel, the channel is switched to the designated speech channel (step 807). The apparatus then waits to receive a ringing signal in this speech channel (step 806). When the on-hook state is set in this reception state, the reception mode of this speech channel is canceled (step 807), and the transmission function is disabled (step 808).

Thereafter, when the ringing signal is received through the speech channel, the apparatus waits for a user's acknowledge signal (step 809).

When the user depressed the off-hook key or the "SEND" key, communication is established (step 810). When communication is completed, the reception mode of the speech channel is canceled (step 807) and the transmission function is disabled (step 808). When a ringing signal is received during communication, the apparatus waits again for the user's acknowledge signal (step 809).

When fading occurs for a predetermined period of time or longer in the speech channel reception mode (step 806), the acknowledge signal sending state (step 804) or a communication enable state (step 810), the transmission function is disabled (step 808).

When the transmission function is disabled (step 808), initialization is resumed (step 802).

Origination processing will be described. The origination is performed in the reception enable mode in the same manner as in the incoming call (steps 804 and 811).

Figure 12:
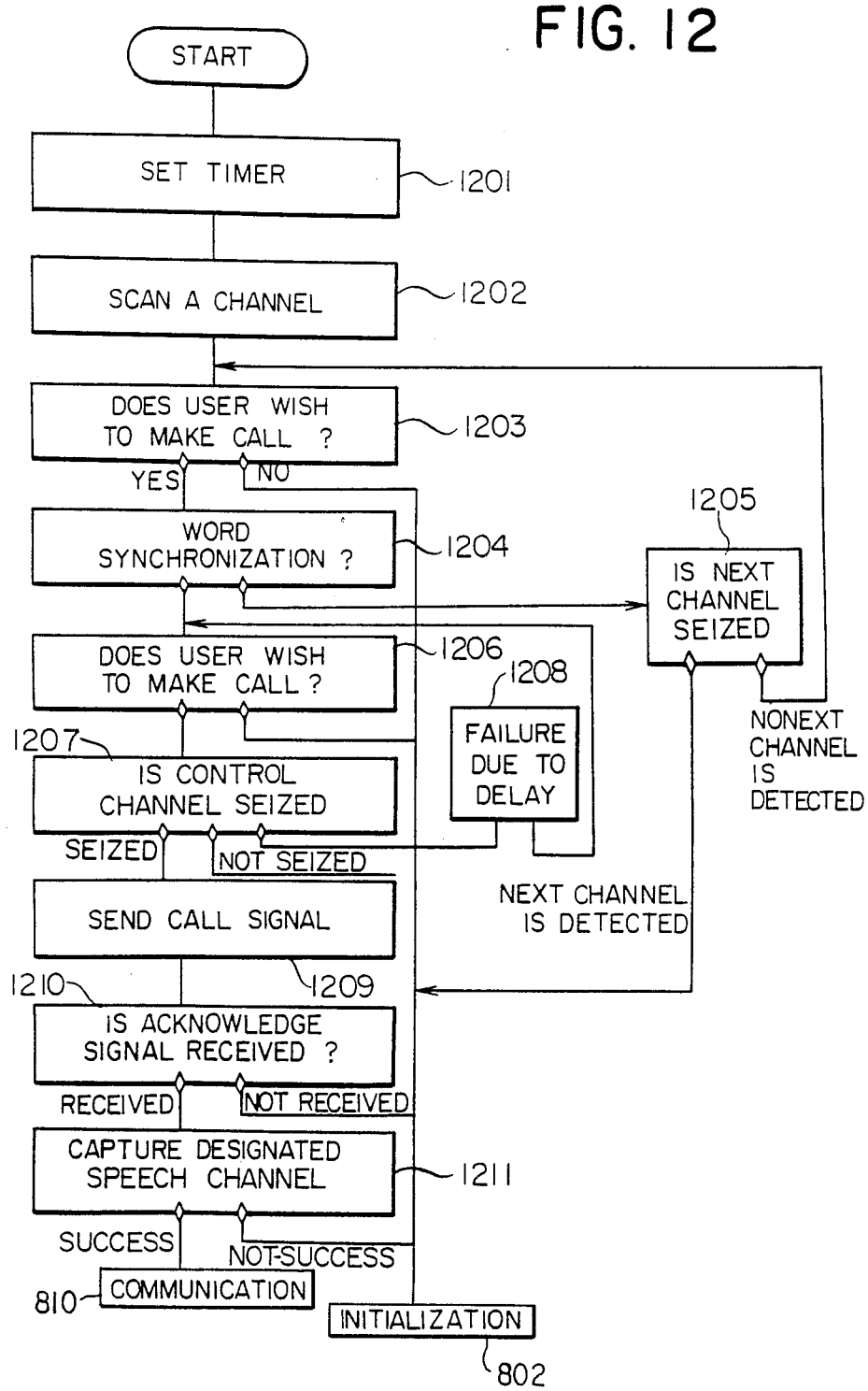
FIG. 12, is a flow chart showing ringing in the connection control operation in the mobile telephone apparatus.

FIG. 12 is a detailed flow chart showing outgoing call processing.

When a call request is detected by an input at the key unit 430 or voice dialing (to be described later), a timer for counting a call reception time is set (step 1201). The set time is, e.g., 12 seconds.

Thereafter, the audio controller in the radio unit causes the demodulator to scan each predetermined control channel (step 1202) to obtain reception electric field intensity information. The channel having the strongest electric field intensity is selected from these control channels and the apparatus is set to receive a signal through the control channel having the strongest intensity. In this case, information of the control channel having the second strongest electric field intensity is also obtained.

Next whether the the user wishes to make a call is checked (step 1203). This check is performed as follows. If the user enters a telephone number to be called and on/off in response to the ON/OFF instruction signals. The depresses the "SEND key, a call flag is set at logic "1". In this case, the apparatus determines that the user wishes to make a call. However, if the user depresses the "END" key after depression of the "SEND" key, the call flag is set at logic "0". In this case, the apparatus determines that the user does not wish to make a call, and initialization is resumed (step 802).

The control signal processor performs bit and frame synchronization operations of the currently received control channel, that is, word synchronization thereof to obtain system information from this control channel (step 1204). However, if word synchronization cannot be performed, the same operation is performed using the control channel having the second strongest intensity (step 1205). In this case, if no word synchronization can be performed, initialization is resumed (step 802).

Then the apparatus confirms again whether the user wishes to make a call (step 1206). As described above, if the call flag is set at logic "1", the apparatus determines that the user wishes to make a call. However, if the call flag is set at logic "0", the apparatus determines that the user does not wish to make a call and initialization is resumed (step 802).

The mobile telephone apparatus 100 confirms whether the selected control channel is appropriate or not for the origination signal to be broadcasted by analysing the system information signal from a base station. Upon the selection of an appropriate control channel, a channel selection flag is changed from logic "0" to logic "1". However, if any appropriate control channels are not to be selected, initialization is resumed (step 802) without changing the content of the channel selection flag. If the selection of an appropriate control channel is delayed (step 1208), the apparatus checks again whether the user wishes to make a call or not (step 1206).

If the mobile telephone apparatus detects that the user wishes to make a call (i.e., the call flag is set at logic "1") and an appropriate control channel for broadcast of an origination signal is selected (i.e., the channel selection flag is set at logic "1"), an origination signal including at least the telephone number to be called which is entered by the user is broadcasted over this control channel (step 1209).

Thereafter, the mobile telephone apparatus detects whether the acknowledge signal from the base station has been received or not (step 1210). And the base station calls up the other party to be called on the basis of the telephone number included in the origination signal.

Then, a communication link may be established between the mobile telephone apparatus and the other telephone apparatus (step 1211). Otherwise, initialization is resumed (step 802).

Thus a communication link can be established as mentioned above (step 810), and thereafter, the communication is closed.

The voice dialing function of the mobile telephone apparatus 100 will be described in detail.

Figure 13:
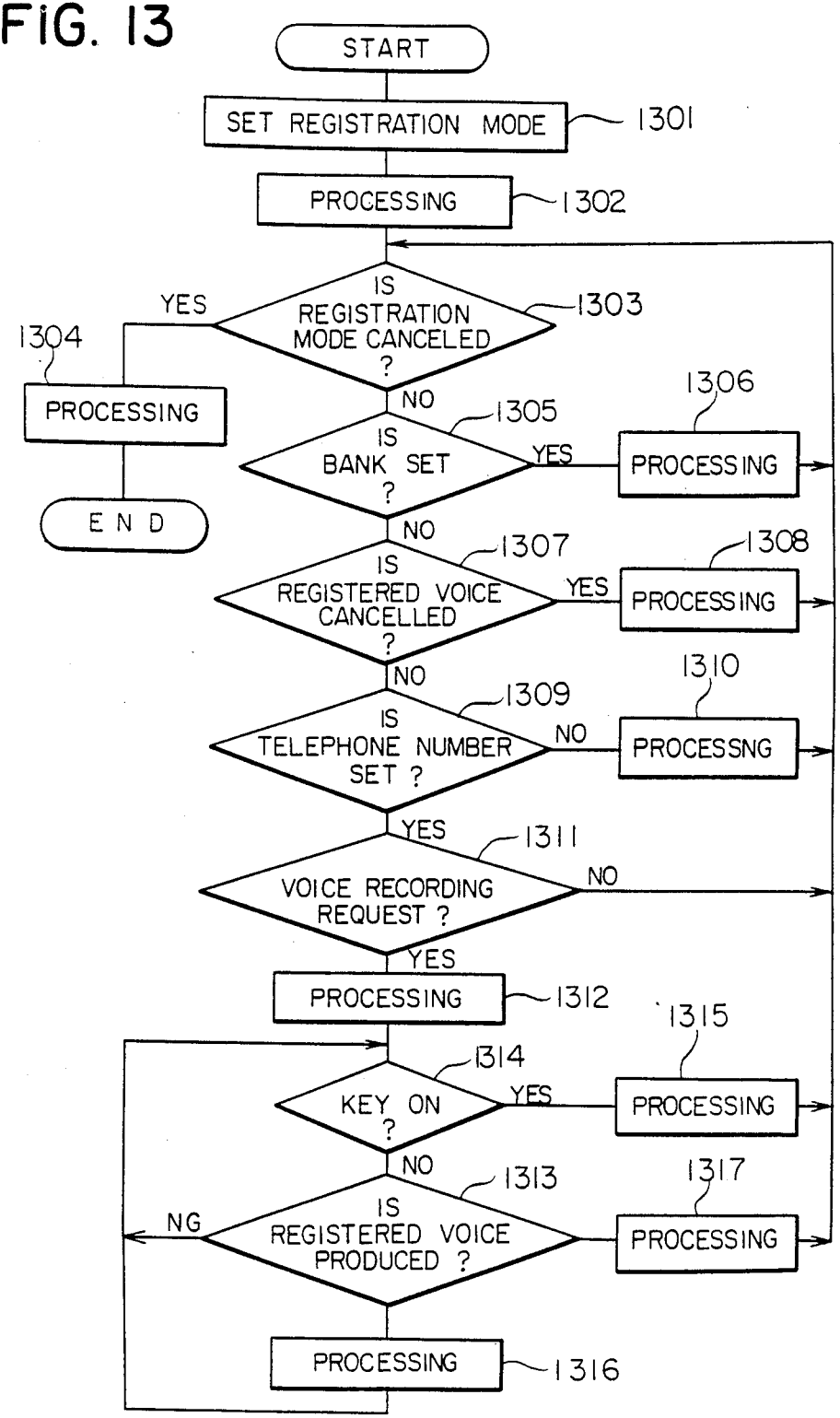
FIG. 13 is a flow chart showing voice dial registration in the mobile telephone apparatus.

When voice dialing in the mobile telephone apparatus 100 is performed, the telephone numbers of the third party to be dialed must be registered in advance. FIG. 13 is a flow chart to show such a registration operation. The registration operation will be described below with reference to the flow chart.

A registration mode is set (step 1301). This mode can be set by predetermined key operations at the key unit 430 (step 1302). For example, the user depresses the "CLR", "X", "Y", "Z", "FUNC", "#", and "5" keys to set the registration mode. "X", "Y", and "Z" constitute an unlocking code, i.e., a personal identification code registered by the user or the like. The unlocking code prevents registration by unauthorized users and damage to the registered data.

When the registration mode is set, the primary function as a telephone function of the mobile telephone apparatus 100 is temporarily interrupted. In other words, an incoming call cannot be received by the mobile telephone apparatus 100, and an outgoing call cannot be made thereat. Therefore, registration operations are not interrupted by an incoming call or the like, and accurate registration can be performed. In the registration mode, a display content "LOCK" flickers and a display content "PWR" is lit.

The mobile telephone apparatus then checks whether the registration mode is canceled (step 1303). This can be achieved by predetermined key operations at the key unit 430. For example, in order to cancel the registration mode, the "FUNC" and "CLR" keys are depressed (step 1304). It should be noted that the components of the apparatus are reset (step 801) when the registration mode is canceled. However, if the registration mode is not canceled, this mode is continuously set.

The mobile telephone apparatus checks whether a "bank" function is set or not in the registration mode (step 1305). This setting can be performed by predetermined key operations at the key unit 430. For example, the "bank" is set by depressing the "RCL", "#", and "X" keys (step 1306). In this case, the "X" key is the "1" or "2" key, and the "3" to "9", "0", "#", and "*" keys are used as inhibition keys. It should be noted that "bank" setting indicates that data to be registered (i.e., telephone numbers) may be divided into a plurality of groups and voice recognition in voice dialing (to be described later) may be performed in units of groups (banks). If "X" is "1" in "bank" setting, registration is performed in "bank 1". However, if "X" is "2", registration is performed in "bank 2". In voice recognition, when "bank 1" is designated, voice recognition is performed on the basis of data registered in only "bank 1". However, if "bank 2" is designated, voice recognition is performed on the basis of data registered in only "bank 2". With performing such bank setting, voice dialing can be performed on the data registered by a plurality of voices and a plurality of users in one mobile telephone apparatus 100. Therefore, voice dialing can be performed quickly and accurately. Alternatively, a single user may use "banks" according to predetermined conditions, e.g., business/private banks, thereby improving convenience in voice dialing.

The mobile telephone apparatus then checks whether the registered data of the other party subjected to voice dialing is to be canceled (step 1307). If cancel key is not operated, canceling is not performed. In order to perform such canceling, the mobile telephone apparatus 100 is set in the entire cancel mode or in the individual cancel mode. The entire cancel mode is set upon sequential depression of the "STO", "#", and "0" keys. In the entire cancel mode, all data of the parties to be called by voice dialing, that is, telephone number data and corresponding to registered voice data are canceled (erased). Therefore, data prior to entire canceling is not left in the "banks" by entire canceling, thus preventing dialing errors caused by data left unerased in the "bank". The individual cancel mode is set upon sequential depression of the "STO", "X", and "Y" keys. "X" and "Y" are registration address data assigned to the parties subjected to voice dialing. A registered telephone number which is rarely used or unnecessary can be erased individually.

A telephone number of a party subjected to voice dialing is set (step 1309). This can be performed by predetermined key operations at the key unit 430 (step 1310). For example, the telephone number is input by depressing the numerical keys, i.e., the "0" to "9" keys. Alternatively, if the telephone number is set in an abbreviated form, the user must depress the "RCL" key and then enter the corresponding telephone number by depressing the "0" to "9" keys. The input telephone number is displayed on the liquid crystal display 452 and is checked by the user.

A registration address for the telephone number set as described above is set (step 1311). This can be performed by predetermined key operations at the key unit 430 (step 1312). For example, the user sequentially depresses the "STO", "X" and "Y" keys which represent registration addresses indicated by the "0" to "9" keys. When the registration address is set, a predetermined tone is output from the loudspeaker 492. The user can know that a two-digit address corresponding to a 9-digit telephone number has been registered.

When the predetermined tone is produced, the name, the company name, and the like of the party corresponding to the telephone number set as described above are registered with a voice (step 1313). In this case, when the user depresses one of the keys in the key unit 430 (step 1314), the registration mode setting state is obtained (steps 1315 and 1302). Even when the user utters wrong words, the initial state for registration mode setting can be set upon depression of any key for a predetermined period of time or more (e.g., one second or more).

Each voice registration cycle is completed by two speech inputs (steps 1316 and 1317). When the first speech utterance of the user is made, e.g., when the user utters "office", the beep tone is generated twice if the utterance time falls within a predetermined period (e.g., one second). Generation of two succeeding beep tones indicates that the first user utterance has been accepted. When the user hears two succeeding beep tones, he makes the second utterance. When the second utterance is accepted, a message representing completion of voice registration, that is, a message "thank you" is sounded together with the synthesized voice sound corresponding to the telephone number set in step 1309. When one voice registration cycle is completed, the user depresses the "FUNC" and "CLR" keys to cancel the registration mode. In this case, assume that the input level of the first utterance is different from that of the second utterance, and the resultant signals having the different levels are used as speech data to be registered.

Thus upon completion of registration, the telephone number set as described above is displayed on the liquid crystal display 452. At the same time, the vocal output indicative of a registered telephone number, which is synthesized by the voice synthesizer 350b, is sounded from the loudspeaker 492. Therefore, the user can visually and audibly confirm the registered telephone number. A call error, i.e., a wrong call, caused by a registration error can be prevented.

Figure 14:
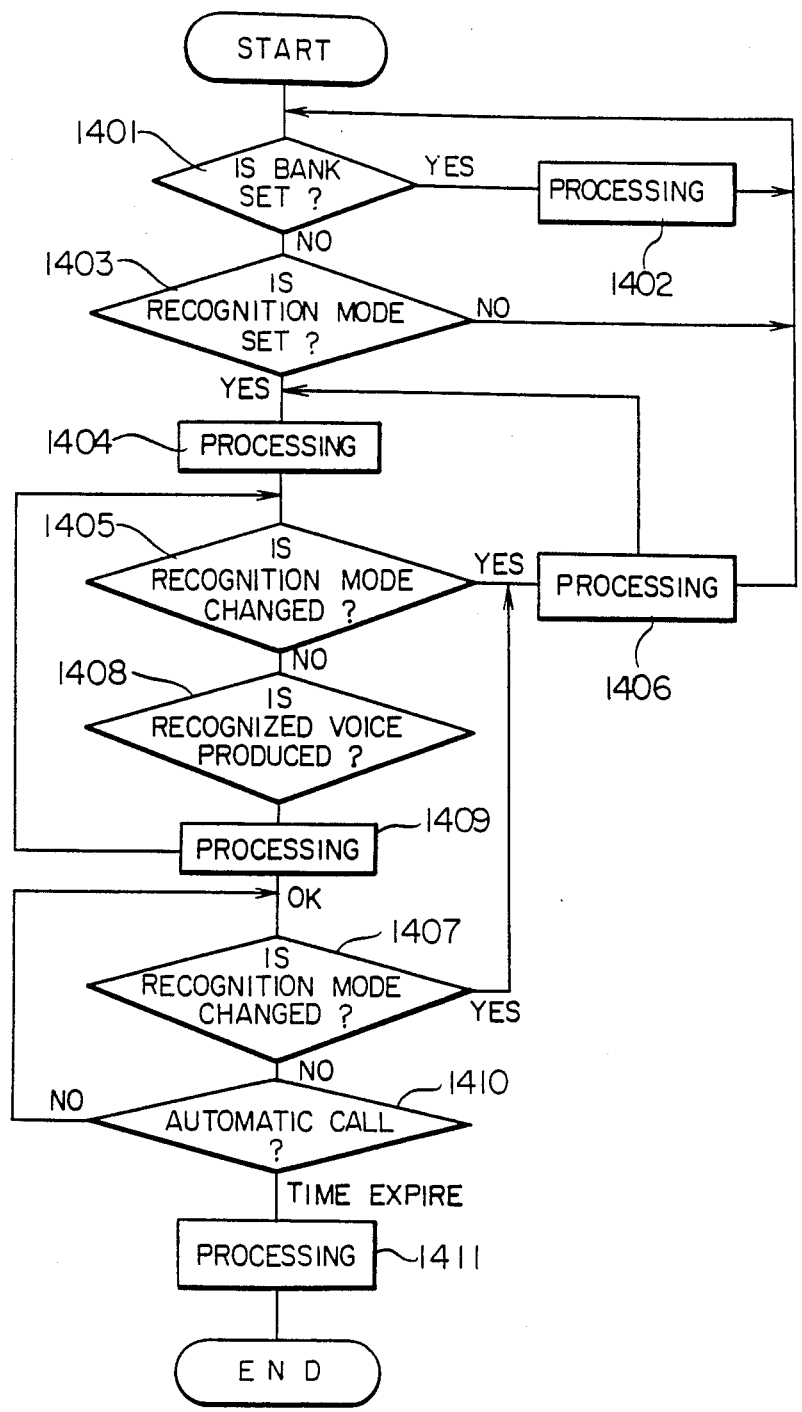
FIG. 14 is a flow chart of voice dial recognition in the mobile telephone apparatus.

Voice dialing will be described with reference to a flow chart in FIG. 14.

If "banks" are set (step 1401), a desired "bank" is designated (step 1402). This operation can be performed by predetermined key operations. For example, the user sequentially depresses the "RCL", "190", and "X" keys. In this case, "X" is a numerical key, i.e., the "1" or "2" key. The "1" key corresponds to "bank 1", and the "2" key corresponds to "bank 2". The bank number designated as described above is displayed on the liquid crystal display 452 and is confirmed by the user.

The voice dial mode (to be referred to as a recognition mode hereinafter) is set (step 1403). This can be set by predetermined key operations at the key unit 430. For example, the user depresses any one of the "0" to "9" keys at the key unit 430 for a predetermined period of time or more, e.g., one second or more. When the recognition mode is set as described above, the "beep tone" is different from the normal beep tone. Therefore, the user hears the beep tone produced at the loudspeaker 492 and can know that the recognition mode has been set (step 1404). The recognition mode continues within a predetermined period, e.g., 6 seconds. In this case, a recognition mode setting signal (H level signal) with a predetermined key operation is input to the OR gate 422b through the controller 418 shown in FIG. 7.

When the recognition mode is set as described above, a mode transition flag is set at logic "1", which indicates that the mobile telephone apparatus is ready for recognizing a user's voice. In this case, the user can reset the recognition mode or cancel it according to a predetermined key operation and predetermined conditions (steps 1405 and 1406). For example, the recognition mode is reset when any one of the "0" to "9" keys in the key unit 430 is kept depressed for a predetermined period of time or longer, e.g., one second or longer. More specifically, when one of the "0" to "9" keys is depressed for a predetermined period of time, all voice recognition results are invalidated, and a beep tone is produced at the loudspeaker 492 again. The recognition setting mode can be resumed even during voice recognition (step 1407). If the user utters wrong information or wishes to change the party to be called, the recognition mode can be reset and voice dialing can be resumed. The recognition mode can be canceled upon depression of one of the "0" to "9" keys within one second.

When the user utters, a word or more (step 1408), the uttered voice is recognized by the voice recognition circuit 350a, and the corresponding telephone number is accessed. The mobile telephone apparatus determines that the user wishes to make a call, and thus the call flag is set at logic "1". (step 1409). The accessed telephone number is displayed on the liquid crystal display 452, and at the same time, the telephone number vocal output synthesized by the voice synthesizer 350b is sounded at the loudspeaker 492. Therefore, the user can confirm the telephone number so that a so-called wrong call will never be made.

When a predetermined period of time (e.g., three seconds) has elapsed after the telephone number is signalled to the user from the liquid crystal display 452 or the loudspeaker 492, an origination by means of the accessed telephone number is automatically performed (steps 1410 and 1411). More specifically, the mobile telephone apparatus 100 determines in step 1206 (FIG. 12) that the user wishes to make a call and seizes a channel through which an origination signal is to be sent. In this channel seizure, as previously described, a channel is selected on the basis of its availability by checking received signal intensity, system information and so on. After the user's wish for making a call is confirmed, an origination signal including the telephone number information recognized by the voice recognition circuit 350a is broadcasted over the selected channel. Until the predetermined period of time has elapsed after the sounding or display of the recognition result (telephone number) for confirmation, the origination is not made. Upon expiration of time for confirmation, the origination is automatically made (automatic call). If the telephone number information signalled to the user does not represent the desired telephone number (step 1409), the recognition mode is reset upon depression of any numerical key for a predetermined period of time or more. And if the user depresses any numerical key for less than the predetermined period of time, the recognition mode is canceled (step 1406). Alternatively, the user may depress the "END" key to cancel the call. In this case, the call interruption signal is generated.

If the user wishes to make an origination immediately, he may depress the "SEND" key without waiting for the expiration of the time for telephone number confirmation. The content of the call flag is changed to logic "1" from logic "0" upon depression of the "SEND" key as previously described in the flow chart of FIG. 12. After detection of a channel available for broadcasting an origination signal, the origination is made. In this manner, an origination is made prior to the automatic call, thereby shortening the time for making a call.

What is claimed is:

1. A telephone apparatus having a voice activated dialing function, comprising:
   transmitting means for transmitting at least a single telephone number;
   receiving means for receiving incoming calls;
   input means for inputting at least a single telephone number, bank designation inputs, mode designation inputs, and speech signals representing at least one user's utterance;
   memory means coupled to the input means for storing the at least single telephone number and the speech signals; and
   control means responsive to the inputs from the input means for controlling the transmitting means and the memory means in one of a plurality of operational modes designated by the mode designation inputs, including:
   (a) a registration mode in which the control means controls the memory means so that a speech signal corresponding to a user's utterance is stored with a corresponding telephone number into a bank area of the memory means designated by the bank designation inputs, and controls the receiving means so that the apparatus does not respond to an incoming call received by the receiving means;
   (b) a voice dialing mode in which, in response to a user's utterance, the control means controls the memory means so as to retrieve a telephone number corresponding to the stored speech signal which is identical to a speech signal corresponding to the user's utterance and stored in a bank area of the memory means designated by the bank designation input and, in the event that the telephone number is retrieved, controls the transmitting means so as to transmit the retrieved telephone number; and
   (c) a standby mode in which the apparatus responds to incoming call and user's operations, a transition from the standby mode to one of the voice dialing mode or the registration mode being made in response to the mode designation input.

2. The apparatus according to claim 1 further comprising display means for providing a display representing the bank area of the memory means designated by the bank designation input.

* * * * *